United States Patent [19]

Hopson et al.

[11] 3,872,308

[45] Mar. 18, 1975

[54] OPTICAL SYSTEM FOR RETICLE-TYPE INFRARED SEEKER

[75] Inventors: James E. Hopson, Wellesley; Gordon C. MacKenzie, North Billerica, both of Mass.

[73] Assignee: Raytheon Company, Lexington, Mass.

[22] Filed: Sept. 28, 1973

[21] Appl. No.: 401,748

[52] U.S. Cl. ............... 250/347, 250/227, 250/338
[51] Int. Cl. ............................................... G02b 5/14
[58] Field of Search ............ 250/338, 347, 353, 227

[56] References Cited
UNITED STATES PATENTS

| | | | |
|---|---|---|---|
| 3,160,751 | 12/1964 | Dunning | 250/347 |
| 3,491,245 | 1/1970 | Hardesty | 250/227 |
| 3,728,548 | 4/1973 | Pinior | 250/227 X |
| 3,751,664 | 8/1973 | Falbel | 250/353 |

*Primary Examiner*—Archie R. Borchelt
*Attorney, Agent, or Firm*—Richard M. Sharkansky; Philip J. McFarland; Joseph D. Pannone

[57] ABSTRACT

An optical system is disclosed which is adapted for use in a reticle type infrared seeker. The effect of central obscurations caused by the structural support of a primary catadioptric focusing arrangement is reduced by the use of a light pipe and a field lens disposed between the image plane of such focusing arrangement and a photodetector.

The disclosed catadioptric arrangement focuses the infrared energy from a target into a small spot in an image plane, the position of the spot being related to the angular deviation of the target from the optical axis of the system. Because of central obscuration caused by the support structure the focused energy is in the form of a hollow annular cone, the apex thereof forming the spot. A reticle is provided in the image plane to modulate the intensity of the energy in accordance with the position of the spot in the image plane. Such modulated energy is then directed to a photodetector through a field lens and a light pipe. The field lens, light pipe and photodetector are suitably arranged so that ring-shaped radiation entering the light pipe is dispersed in the plane of the face of the photodetector. The disclosed system is particularly suitable for use where the catadioptric arrangement, the reticle, the field lens and the light pipe are gimballed with respect to the photodetector.

5 Claims, 3 Drawing Figures

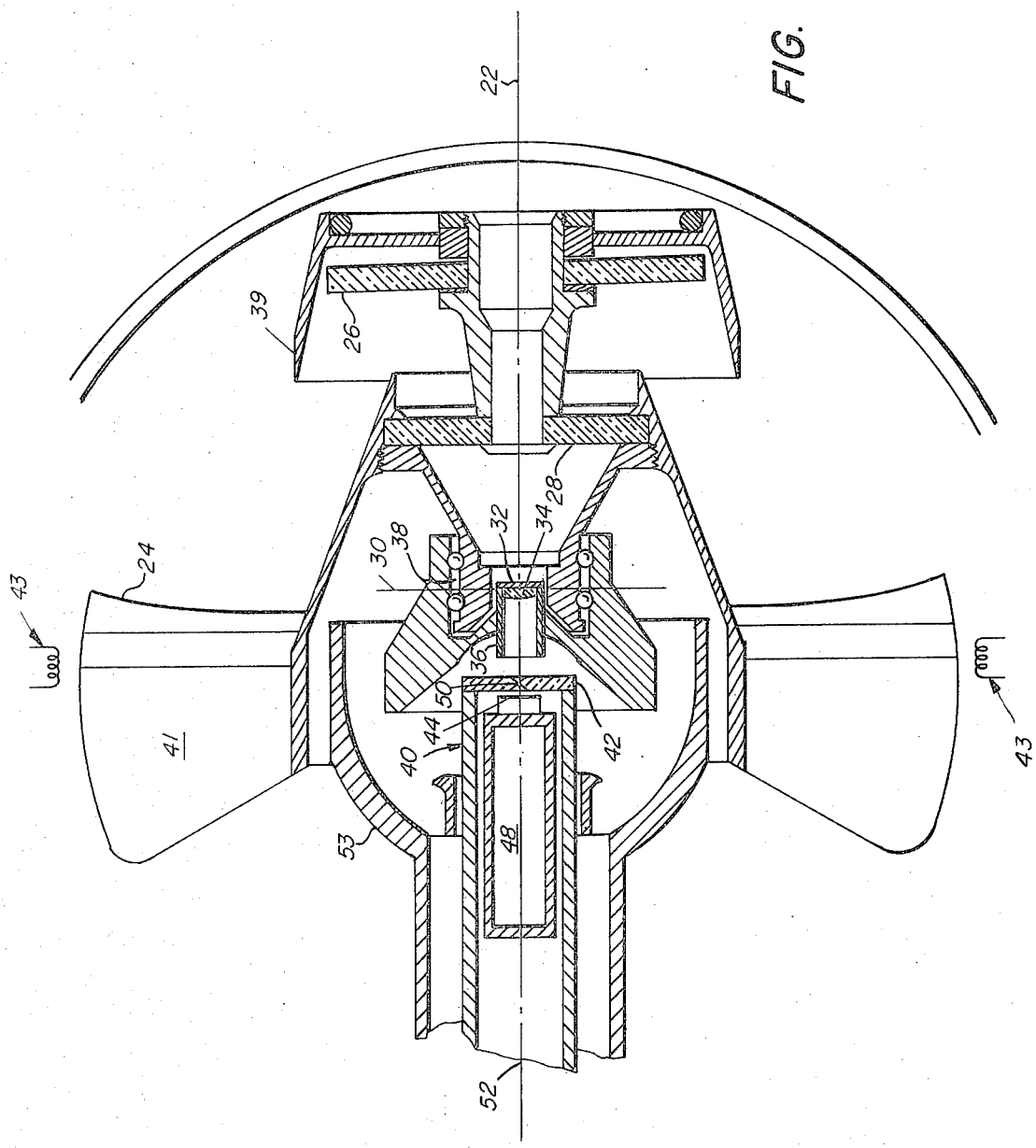

OPTICAL SYSTEM FOR RETICLE-TYPE INFRARED SEEKER

BACKGROUND OF THE INVENTION

This invention relates generally to optical systems and more particularly to optical systems which are adapted for use in reticle type infrared missile seekers.

In a known reticle tupe infrared missile seeker an optical system thereof includes a catadioptric arrangement, including a primary and secondary mirror, for focusing infrared energy from an external source, such as a target, at a small spot in an image plane. The position of the small spot in the image plane is related to the angular deviation of the target from the boresight, or optical, axis of the catadioptric arrangement. Disposed within the image plane, along the boresight axis, is a reticle which rotates about the optical axis. As the reticle rotates, the intensity of the infrared energy passing through the reticle is modulated in accordance with the position of the spot in the image plane. Such modulated infrared energy is directed onto a photodetector by means of a refractive focusing arrangement. Hence, the response of the photodetector to the infrared energy impinging thereon provides an indication of the angular deviation of the target from the boresight optical axis.

The refractive focusing system in such known seeker includes a field lens, a positive meniscus lens (which forms the window for a Dewar flask), and an immersion lens to direct the modulated infrared energy to a photodetector. In such known seeker a portion thereof, in particular the field lens, the reticle and the catadioptric arrangement, is gimballed with respect to the window of the Dewar flask and the photodetector. With the reticle and photodetector disposed along the optical axis of the arrangement, only an outer annular portion of the primary reflector may be used to reflect the infrared energy entering the frontal portion at a small spot focused on the image plane. Due to central obscuration of the arrangement the radiation is in the form of a hollow annular cone, the apex thereof forming the spot. Therefore, the energy impinging on the photodetector is ring-shaped and hence nonumiform in density over the surface of the photodetector. In a nominal zero gimbal angle condition the seeker is directed along the longitudinal axis of the missile and the optical axis is normal to the plane in which the photodetector is disposed. As the gimballed portion of the seeker is driven from the nominal condition the ring-shaped radiation tends to distort and spread toward the peripheral portion of the photodetector due to defocusing and general misalignment of the fixed miniscus lens and photodetector. This effect is particularly noticeable for certain off-axis target positions where the image spot is located near the edge of the reticle. At relatively large gimbal angles associated with these off-axis target positions considerable loss in collection efficiency may result under certain conditions and the seeker may therefore be unable to track a target as desired.

SUMMARY OF THE INVENTION

With this background of the invention in mind it is therefore an object of this invention to provide an improved reticle type infrared missile seeker wherein a portion of the optics used in such seeker is gimballed within the missile with respect to a photodetector and the collection efficiency of such seeker is greatly improved at large gimbal angles.

This and other objects of the invention are attained generally by providing an optical system comprising means for focusing the apex of a hollow annular cone of energy at a spot in an image plane; a photodetector, and, means disposed between the image plane and the photodetector for dispersing the energy in a small region on the face of the photodetector. In a preferred embodiment the focusing means includes a folded optical arrangement made up of a primary and a secondary reflector, and the dispersing means includes a light pipe. Means are provided to gimbal the light pipe and the folded optical arrangement about the photodetector. Reticle means are also provided for modulating the intensity of the energy passing through the image plane in accordance with the position of the small spot in the image plane. A field lens is also included, such lens being disposed between the reticle means and the entrance of the light pipe.

BRIEF DESCRIPTION OF THE DRAWINGS

The foregoing features of this invention, as well as the invention itself, may be more fully understood from the following detailed description read together with the accompanying drawings, in which:

FIG. 2 is a sketch, greatly simplified, illustrating a seeker according to the invention.

DESCRIPTION OF THE PREFERRED EMBODIMENT

Figure 1:
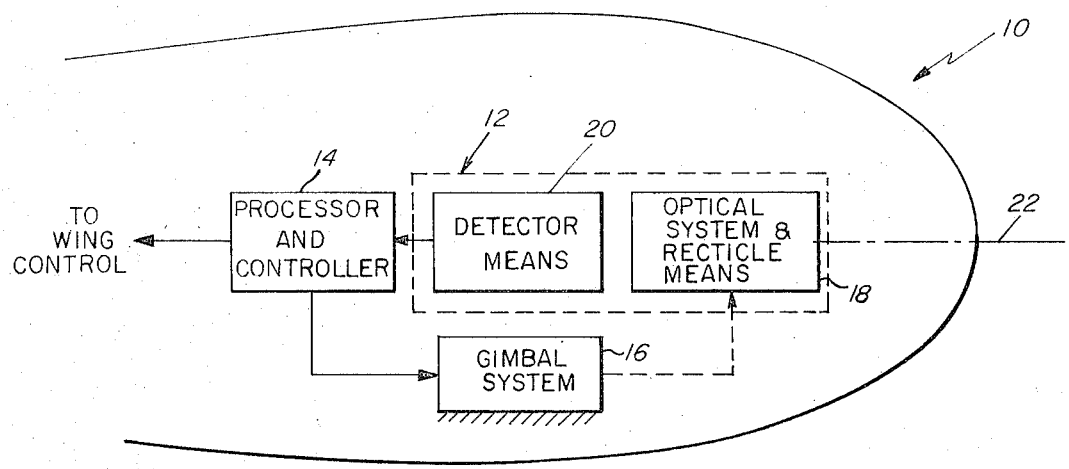
FIG. 1 is a simplified sketch of a portion of a missile incorporating a seeker according to the invention.

Referring now to FIG. 1, the frontal portion of an air-to-air missile 10 is shown to include a seeker 12, a processor and controller 14 and a gimbal system 16. Such missile 10 is adapted to be launched from an aircraft (not shown) and directed towards a target (not shown) by guidance signals developed within the missile. Such guidance signals are developed in response to electrical signals produced by seeker 12 in response to the portion of the infrared energy emitted by the target which passes through the missile's "I.R. dome." Seeker 12, the details of which are described in connection with FIG. 2, includes an optical system and reticle means 18 and a detector means 20. The optical system and reticle means 18 direct infrared energy passing through the frontal portion of the missile 10 onto the detector means 20. The energy impinging upon the detector means 20 is modulated in accordance with the angular deviation of the target from the optical axis 22. The detector means 20 produces electrical signals in accordance with the modulation in a conventional manner. The electrical signals are passed to a processor and controller 14, here of any conventional design, to develop control signals for the wing control section of the missile (not shown) and the gimbal system 16, also of conventional design. Such gimbal system 16 is used to gimbal the optical system and reticle means 18 within the missile to cause the optical system and reticle means 18 to track the target.

Referring now to FIG. 2, seeker 12 is shown to include a catadioptric optical system including a spherical primary mirror 24, a flat secondary mirror 26, such mirror being tilted with respect to a plane normal to the optical axis 22, and a transparent support disc 28. The catadioptric optical system focuses a portion of the infrared energy passing through the missile's frontal portion onto a small spot in an image plane 30. The frontal portion of the missile is a conventional I.R. dome rigidly mounted to the missile. The I.R. dome and transparent support disc 28 are designed to reduce spherical aberration. The flat secondary mirror 26 is used to fold the path of infrared energy within the optical system. Disposed within the image plane 30 is a reticle 32. Reticle 32 may be of any convenient design. Such reticle 32 is affixed to a field lens 34, here by use of a suitable epoxy (not shown) disposed about the peripheral portion of the lens 34 and the reticle 32. Lens 34 is affixed, by any convenient means, again as by a suitable epoxy (not shown), within a light pipe 36. Here the light pipe 36 is hollow, having a rectangular cross-section along the optical axis 22. The interior portion of such light pipe 36 is coated with a reflective material suitable for reflecting infrared energy, for example, gold. Light pipe 36, lens 34 and reticle 32 are mounted through bearings 38 to the catadioptric optical system support structure 39. The light pipe 36, lens 34 and reticle 32 are adapted to rotate with respect to the support structure 39 about the optical axis 22, here by forming the primary reflector 24 as the rotor of an electric motor. In particular, the housing 41 of primary reflector 24 is a permanent magnet. The stator of such motor includes coils 43 for establishing the electric field necessary to react with the permanent magnet 41 in a conventional manner.

Completing the seeker 12 (FIG. 1.) is a detector means 20 shown in FIG. 2 to include a Dewar flask 40; a silicon window lens 42; a photodetector 44 (here and InSb detector) and a cryogenic chamber 48 for enabling a suitable cryogenic substance to cool photodetector 44. Gimbal system 16 (FIG. 1) is of conventional design and is used to gimbal the optical system and reticle means 18 about pivot point 50, such pivot point 50 being disposed adjacent the photodetector 44 as shown. In a nominal condition the optical axis 22 is coaxial with the longitudinal axis 52 of the missile.

Figure 3:
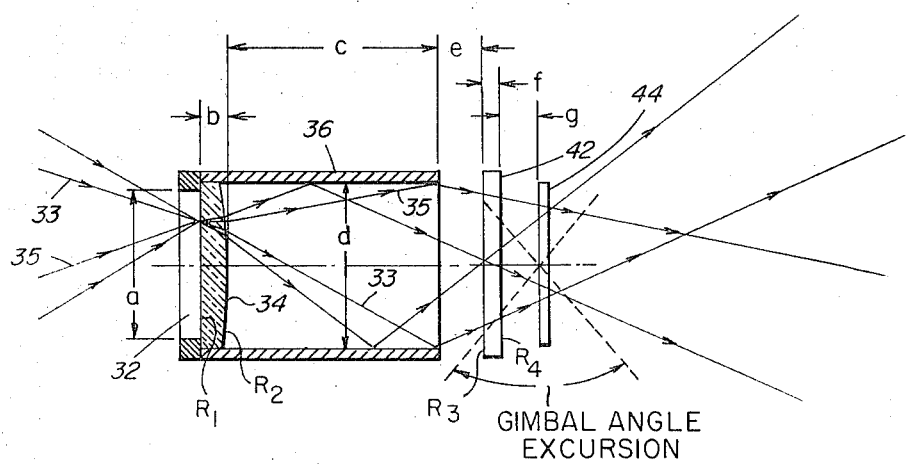
FIG. 3 is a ray diagram, in a meridional plane, useful in understanding the features of the invention.

In operation, infrared energy passing through the frontal portion of missile 10 is focused to a small spot in the image plane 30. It is noted that, because of the blockage or obscuration resulting from support structure 39, the energy will be in the shape of a hollow cone and the apex thereof will be the spot in the image plane. The position of the spot in the image plane will depend upon the angular deviation of the target from the optical axis 22 (or boresight axis) of the seeker 12. The tilted secondary mirror 26 rotates about optical axis 22 so that energy from a target will nutate in the image plane 30 and the intensity of the infrared energy passing through the reticle 32 will be modulated in accordance with the angular deviation of the target from the optical axis 22. Here the reticle 32 is selected as one which has a series of alternating opaque and transparent wedge-shaped areas. Therefore, the rotary motion of the reticle 32 about the optical axis 22 causes the intensity of the radiation in such spot to be frequency modulated in accordance with the position of the spot in the image plane 30. The infrared energy passed through the reticle 32 is directed onto photodetector 44 by means of, inter alia, the field lens 34 and the light pipe 36. The energy passing through the reticle 32 is in the shape of a hollow annular cone. The function of the field lens 34 is to direct the energy passing through the reticle 32 such that at the exit end of the light pipe 36 (within the accuracy of any aberrations present at such exit end) the inner diameter of the cone is equal to the inner diameter of the light pipe 36 as indicated in FIG. 3 by rays 33, 35. Light pipe 36 reflects all the energy passing therethrough once and only once with the result that such energy is scrambled, dispersed and concentrated into a relatively compact area on the face of the photodetector 44 (FIG. 3). Further, as the optical system and reticle means 18 is gimballed with respect to the missile's body the energy passing out of light pipe 36 remains concentrated in a relatively compact area.

Referring to FIG. 3, the following prescription has been found to provide suitable results: field lens 34 is germanium having a dimension $b$ of 0.02 inches, a radius $R_1$ of infinity and a radius $R_2$ of minus 0.55 inches; the diameter of the transparent portion of reticle 32, i.e. dimension $a$ is 0.060 inches; light pipe 36 is hollow, having a dimension $c$ of 0.157 inches and a dimension $d$ of 0.100 inches; Dewar flask lens 42 is silicon having a dimension $f$ equal to 0.02 inches, a radius $R_3$ of infinity and a radius $R_4$ of infinity; and the separation between light pipe 36 and window lens 42, i.e. the dimension $e$, is 0.052 inches; and the separation between the photodetector 44 and the window lens 42, i.e. dimension $g$, is 0.17 inches.

Having described a preferred embodiment of this invention, it is evident that other embodiments incorporating these concepts may be used. For example, light pipe 36 may be tapered, thereby enabling the use of a smaller size detector. It is felt, therefore, that this invention should not be restricted to the disclosed embodiment but rather should be limited only by the spirit and scope of the appended claims.

What is claimed is:

1. An optical arrangement, comprising:
   a. a photodetector;
   b. means for focusing the apex of a cone of energy having a hollow central portion at a small spot in an image plane, such small spot being the apex of a cone of exiting energy having a hollow central portion; and
   c. means disposed between the image plane and the photodetector for dispersing the exiting energy over the central portion thereof at the photodetector.

2. The optical arrangement recited in claim 1 wherein the dispersing means includes a light pipe.

3. The optical arrangement recited in claim 2 wherein:
   a. the entering energy focused at the small spot passes through the image plane in the shape of a hollow cone of exiting energy defined by inner and outer rays; and
   b. the dispersing means includes a field lens means disposed between the image plane and the light pipe for directing the inner rays of the cone of energy at a position coincident with the exit end of the light pipe.

4. The optical arrangement recited in claim 2 wherein a reticle means is disposed between the image plane and the light pipe for modulating the intensity of the energy in the image plane in accordance with the position of the small spot in such image plane.

5. The optical arrangement recited in claim 2 including means adapted to rotate the focusing means and the dispersing means relative to the photodetector.

* * * * *